(12) United States Patent
Gilbert et al.

(10) Patent No.: US 8,961,054 B2
(45) Date of Patent: Feb. 24, 2015

(54) GRILL OILER

(75) Inventors: Peter J. Gilbert, San Clemente, CA (US); J. Matthew May, Palatine, IL (US)

(73) Assignee: Gilbert Performance Design, LLC, Pinehurst, NC (US)

( * ) Notice: Subject to any disclaimer, the term of this patent is extended or adjusted under 35 U.S.C. 154(b) by 588 days.

(21) Appl. No.: 13/212,158

(22) Filed: Aug. 17, 2011

(65) Prior Publication Data

US 2012/0063836 A1 Mar. 15, 2012

Related U.S. Application Data

(60) Provisional application No. 61/403,110, filed on Sep. 11, 2010.

(51) Int. Cl.
| | |
|---|---|
| *B43M 11/02* | (2006.01) |
| *A47J 37/07* | (2006.01) |
| *B05C 17/02* | (2006.01) |
| *B05C 17/035* | (2006.01) |

(52) U.S. Cl.
CPC ......... *A47J 37/0786* (2013.01); *B05C 17/0205* (2013.01); *B05C 17/0207* (2013.01); *B05C 17/0222* (2013.01); *B05C 17/035* (2013.01)
USPC ................................ 401/219; 494/28; 494/55

(58) Field of Classification Search
USPC ............ 401/6, 219, 220, 197; 492/28, 29, 32, 492/55, 56
See application file for complete search history.

(56) References Cited

U.S. PATENT DOCUMENTS

| | | | |
|---|---|---|---|
| 1,973,093 A | | 9/1934 | Moore |
| 3,179,971 A | * | 4/1965 | Benedetti ........................ 401/4 |
| 3,702,739 A | * | 11/1972 | Rentfrow ..................... 401/197 |
| 3,850,298 A | * | 11/1974 | Jolly ............................. 206/349 |
| 4,732,503 A | | 3/1988 | Bader et al. |
| 4,821,362 A | * | 4/1989 | Kolb ........................... 15/248.2 |
| 5,015,112 A | | 5/1991 | Arnold |
| 5,254,108 A | | 10/1993 | Burrell et al. |
| 5,614,021 A | * | 3/1997 | Catlin .......................... 118/258 |
| 5,769,769 A | | 6/1998 | Torntore |
| 5,902,653 A | * | 5/1999 | Miyahara et al. ............ 428/34.1 |
| 6,109,809 A | * | 8/2000 | Pistis ............................ 401/197 |
| 6,261,014 B1 | * | 7/2001 | Altobellis et al. ................ 401/6 |
| 6,916,382 B1 | * | 7/2005 | Aldredge .......................... 134/6 |
| D522,246 S | | 6/2006 | Franczak et al. |
| 7,143,687 B2 | | 12/2006 | Pearlman et al. |
| 7,309,185 B2 | * | 12/2007 | Thorpe et al. ................. 401/277 |
| 7,455,469 B1 | * | 11/2008 | Langdon ....................... 401/219 |
| 2005/0207820 A1 | | 9/2005 | Franczak et al. |
| 2008/0052853 A1 | | 3/2008 | Dale et al. |

* cited by examiner

*Primary Examiner* — David Walczak
(74) *Attorney, Agent, or Firm* — Sean P. O'Hanlon, Esq., PLLC

(57) ABSTRACT

A non-drip applicator that allows easy lubrication and seasoning of barbecue grilling grates or griddle cooking surfaces in an easy, fire safe, and efficient manner is described and claimed. The tool includes a body, an applicator, and, optionally, an irrigation system. The applicator may retain a supply of cooking oil therein, or cooking oil may be transferred to the applicator via the irrigation system. The application of pressure to the applicator by pressing it against the grill cooking elements causes cooking oil to be transferred from the applicator to the cooking elements. The applicator may be rotatably connected to the tool body, allowing the user to oil the grill by rolling the applicator along the grill cooking elements.

10 Claims, 5 Drawing Sheets

GRILL OILER

CROSS-REFERENCE TO RELATED APPLICATIONS

This patent application claims the benefit of U.S. Provisional Patent Application No. 61/403,110 filed on Sep. 11, 2010, which is incorporated herein by reference in its entirety.

BACKGROUND OF THE INVENTION

1. Field of the Invention

The present invention relates to a culinary tool, and, more particularly, the present invention relates to a tool that allows the user to quickly, safely, and easily apply oil to the cooking elements of a grill.

2. Description of the Related Art

Many people enjoy cooking on a grill, and prefer to eat food that has been cooked on a grill. Grills come in various forms, including propane gas grills, natural gas grills, and charcoal grills. One frequent problem with grilling is that food can stick to the grill cooking elements, such as grates or griddles.

To prevent food from sticking, the grill cooking elements must be cleaned and oiled. Cleaning typically entails scraping the cooking elements with a wire brush. Oiling the cooking elements typically entails brushing the cooking elements with a rag made of cloth or paper that has been saturated with cooking oil. Oiling the grill also adds the attractive "grill marks" desired from barbecue grilling. The grill should be oiled while it is hot, shortly before the food is placed on the grill. This typically entails soaking a towel (paper or cloth) in cooking oil, then brushing the towel over the grill bars with a fork or tongs.

Problems are inherent with this typical method of oiling the grill. For example, oil may drip from the saturated cloth onto the coals or flame(s), which can lead to a fire. The rag or towel used to apply the oil may also slip or fall through the grates and catch fire. Furthermore, using a towel or rag to transfer oil to the grill can result in wasting a significant amount of oil.

Another known method of oiling a grill entails spraying them with non-stick cooking oil. The spray method disperses cooking oil with the assistance of aerosol. However, the problems discussed above also apply to this method. The spray technique causes the oil to flash off when spraying into the fire or coals. If sprayed on a cold grill, the concentration of oil is insufficient to stay adhered when the grill comes up to cooking temperature. The cooking oils being used are very limited to those that come in an aerosol can, and do not have the gourmet qualities associated with olive, corn, or canola.

SUMMARY OF THE INVENTION

The present invention is a culinary tool that solves the problems inherent with known methods of oiling a grill. The present invention is directed to a non-drip applicator that allows easy lubrication and seasoning of barbecue grilling grates or griddle cooking surfaces in an easy, fire safe, and efficient way. The invention includes an applicator tool that operates like a paint roller to efficiently roll, or a sponge pad that presses, oil onto the grilling grates or griddle surfaces. The system has either an integral lubrication well with associated feed lines, or the rolling or spreading pads are pre-oiled. The applicator element is easily replaceable.

The tool includes an elongate body to which the applicator is attached. The tool may further include a handle, which may be a separate element or integral with the body. The applicator is formed of a fire retardant material and may be provided in a variety of forms. In a first form, the applicator has a porous structure that acts as a sponge to retain cooking oil therein. The applicator may contain a sleeve surrounding the porous material to provide an additional layer of fire resistance. Applying a compressive force to the sponge, such as by pressing it against the grates of a grill, causes the oil to be dispensed and transferred to the grates. The applicator preferably has a cylindrical shape and is rotatably connected to the tool body. In use, the user grasps the tool handle and presses the applicator to the cooking surface to be oiled. By moving the applicator along the cooking elements, the applicator is rotated and cooking oil can be applied to the cooking surface as desired.

In another form, the applicator is not impregnated with oil. Rather, the tool includes an irrigation system that transfers cooking oil from a storage location to the applicator. The irrigation system includes a reservoir for retaining a volume of cooking oil. The reservoir preferably may be positioned within the tool handle. Tubing connects the reservoir and a dispensing outlet, which preferably is positioned adjacent the applicator. The user engages a trigger to transfer the oil from the reservoir, through the tubing, to the dispenser.

Regardless of its form, the applicator preferably has a textured outer surface. The texture can take a variety of forms, such as spikes, knobs, protrusions, indentations, grooves, slots, or a mesh pattern. The textured surface creates surface tension in the cooking oil, causing it to adhere to the applicator. This further ensures that the cooking oil is retained within the applicator and is not discharged in an unwanted manner. The outer surface is flexible, and when it is deformed, such as by being pressed against the cooking surface of a grill, the deformation breaks the surface tension and allows the oil to be transferred from the applicator to the surface to be oiled.

The applicator may be layered, preferably with a void formed between the layers. Oil is retained within the void by surface tension and adhesion, and is transferred to the cooking surface when the applicator is deformed as described above.

DESCRIPTION OF THE DRAWINGS

The present invention is described with reference to the accompanying drawings, in which like reference characters reference like elements, and wherein.

DETAILED DESCRIPTION OF THE INVENTION

The present invention relates to a tool that allows the user to quickly, safely, and easily apply oil to the cooking elements of a grill. The grilling accessory is used to apply oil to a hot grill for the purpose of keeping the cooking elements clean while providing a non-stick surface during grilling.

Figure 1:
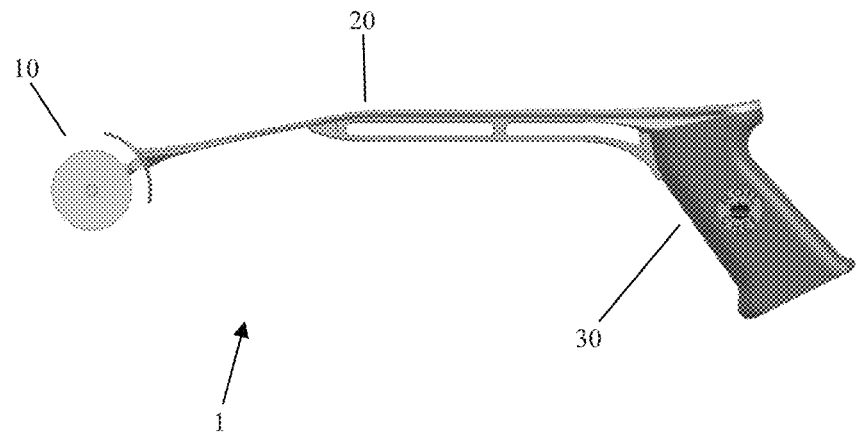
FIG. 1 shows an inventive tool of the present invention.
Figure 2:
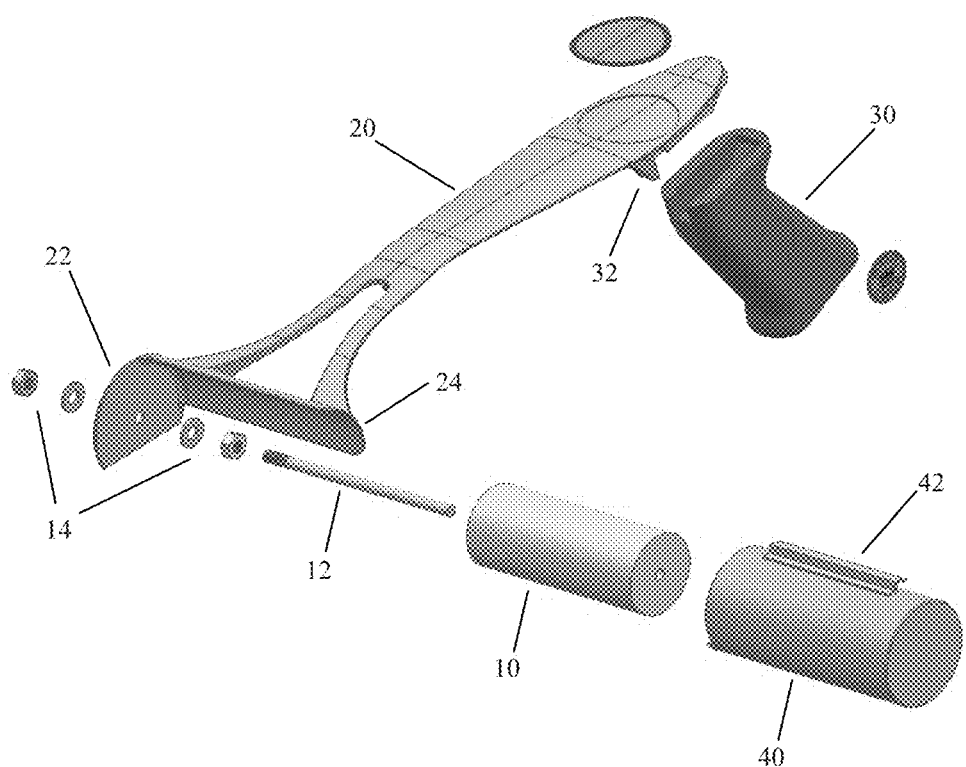
FIG. 2 shows an exploded view of the tool of FIG. 1.

FIG. 1 shows a preferred embodiment of the inventive tool 1, and FIG. 2 shows an exploded view thereof. The tool 1 includes an applicator element 10, a body 20, and a handle 30. The applicator element may be provided in various forms. One form includes a pad that has been pre-loaded with oil.

Figure 3:
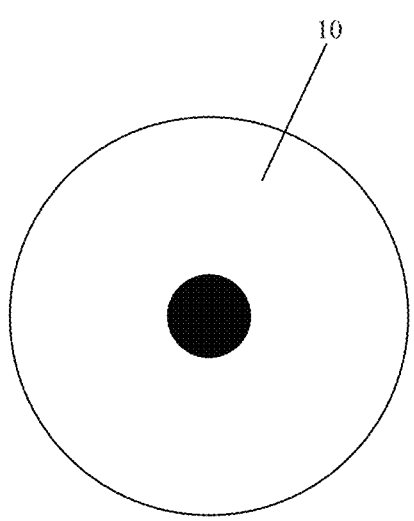
FIGS. 3-5 show applicator elements of the tool of FIG. 1.
Figure 4:
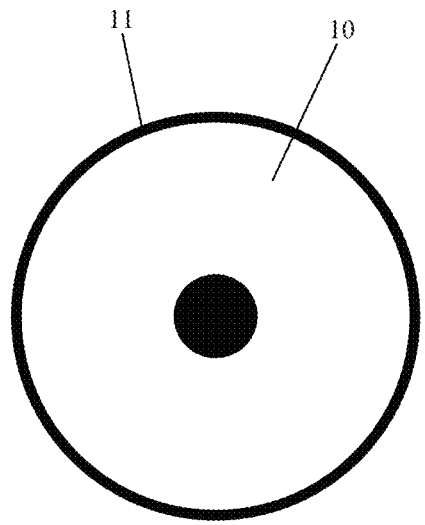

Preferred oils for use with the instant invention include olive, corn, canola, sunflower, coconut, margarine, butter, vegetable, flax seed, peanut, safflower, and palm. FIGS. 3 and 4 show cross-sectional views of pad-type applicator elements 10 of the tool 1. The pad 10 of FIG. 3 is cylindrical in shape, having a hole passing through its center about its longitudinal axis. This pad 10 is formed of a fire retardant spongy or porous material, silicone being a preferred material. The material is able to withstand temperatures up to preferably approximately 350° C., and more preferably up to approximately 600° F. for a duration of approximately 15-20 seconds. This ensures that the tool 1 can be used safely to apply oil to hot grill cooking elements.

The pad 10 of FIG. 4 is similar in size and shape to that of FIG. 3, but this pad 10 further includes a fire retardant fabric sleeve 11 surrounding the silicone sponge. The sleeve 11 provides additional protection for the heat generated by the grill.

The sponge is saturated with cooking oil. The user grasps the handle 30 and rolls the pad 10 along the grill cooking elements. Lateral movement of the handle 30 and body 20 is converted to rotational movement of the applicator 10 against the grill cooking elements, causing the impregnated oil to be transferred thereto. The user can control the rate of oil transfer by varying the amount of pressure that is applied to the pad 10 by the user's hand through the handle 30, body 20, and axle 12.

The applicator 10 is connected to the body 20 via an axle 12 and fasteners 14, which may include washers and nuts. The applicator has a central hole passing through its longitudinal axis, through which the axle 12 is positioned. The axle 12 also extends through holes in connection plates 22 of the body 20. Alternate attachment arrangements can be used. For example, the plates 22 may contain slots that extend from a central location radially outward to allow the axle 12 to slide into its operation position in a direction substantially perpendicular to its longitudinal axis. With this arrangement, the inner fasteners 14 can be replaced with flanges, reducing the number of components. It will be appreciated that only one connection plate 22 and set of fasteners 14 are shown in the partially cut away view of FIG. 2. Thus, the applicator 10 is retained to the body 20 but is freely rotatable about its longitudinal axis and axle 12. A guard 24 may be provided on the body 20 to capture any backsplash that may occur during use. A cover 40 may be matingly coupled to the body 20, such as by sliding over the connections plates 22, to protect the applicator 10 when not in use. One or more rails 42 may be included to facilitate the cover-to-body connection. The rail 42 of the illustrated embodiment has an S shape that cooperates with corresponding rails on the guard 24 to retain the cover 40 in place about the applicator 10. The cover 40 may be provided with a hook to allow the tool 1 to be hung on the grill or another location for storage.

Figure 5:
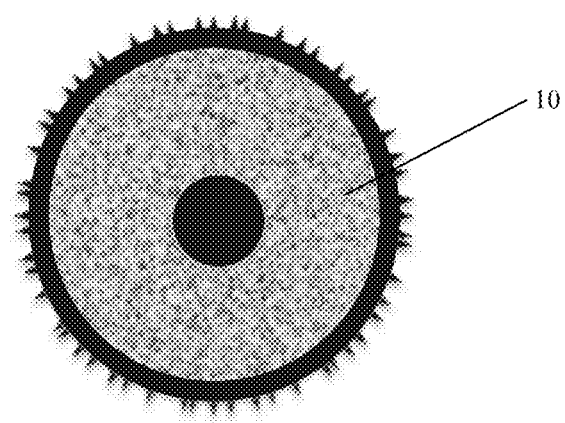

The surface of the pads 10 can be smooth as illustrated in FIGS. 3 and 4, or the surface can be textured. FIG. 5 shows an example of such a textured surface. The surface of the pad 10 contains spikes that intermittently extend above the pad surface. Preferably, the spikes are densely packed on the pad surface.

Figure 6:
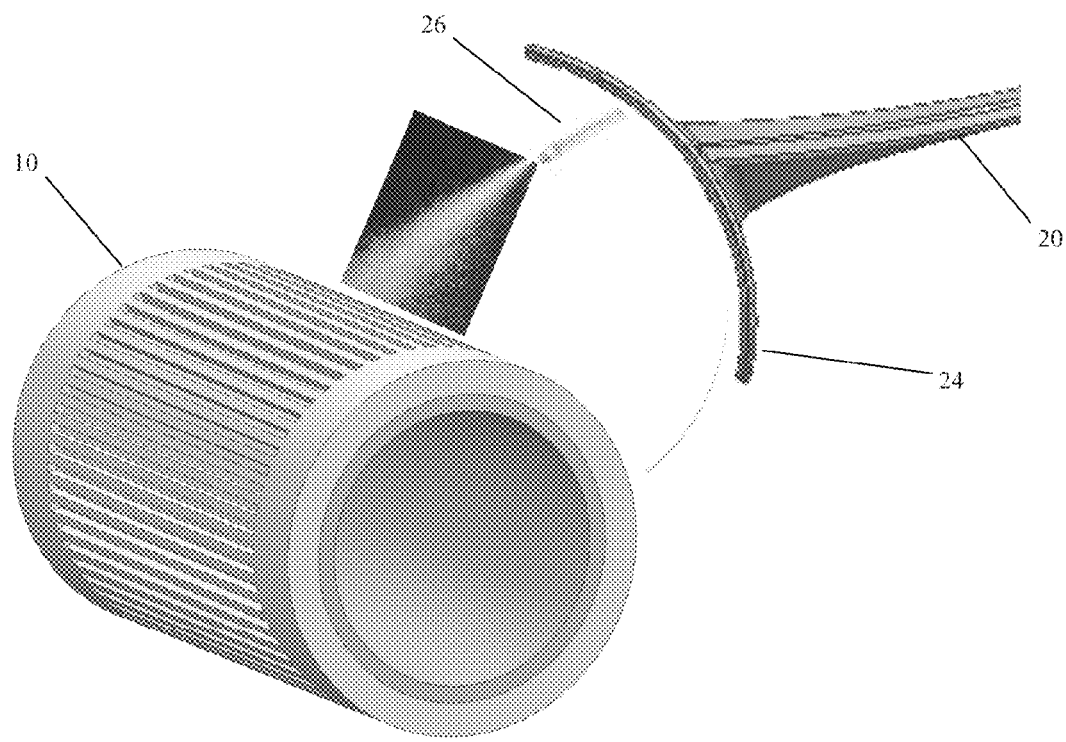
FIG. 6 shows a spraying mechanism of the tool of FIG. 1.

Instead of being impregnated with oil, another form in which the applicator 10 can be provided is a roller to which oil is supplied via an irrigation system. A supply of oil is provided in, for example, the handle 30. As shown in FIG. 2, the handle 30 can be hollow and used to store and retain a reservoir or bottle of cooking oil. A trigger 32 is associated with the reservoir in known fashion to pump oil from the reservoir through the irrigation system. Preferably, the irrigation system may comprise one or more tubes that extend from the handle 30 along the body 20 to the applicator 10. The tubes may be disposed on the underside of the body 20. As shown in FIG. 6, one or more dispensing nozzles 26 may be provided on the underside of the guard 24. The nozzle 26 is directed at the applicator 10 to coat it with oil. The user may depress the trigger 32 multiple times to apply the desired amount of oil to the applicator 10. Moreover, the user can depress the trigger 32 to dispense oil while the tool 1 is in use over a hot grill. The oil is sprayed onto the applicator 10 and is thus not projected onto the coals or flames of the grill.

An additional benefit of suspending the tool 1 from the hook when not in use is that the resulting posture of the tool 1, as any oil in the irrigation system is gravity-biased toward the reservoir and away from the dispenser 26.

While a manual trigger 32 is shown in the illustrative example of FIG. 2, it may take various other forms. For example, the trigger 32 may be a pump that is activated by finger pressure, a finger and lever mechanism, a battery, a pressurized oil cartridge and switch, or by gravity with an open/close gate mechanism.

Figure 7:
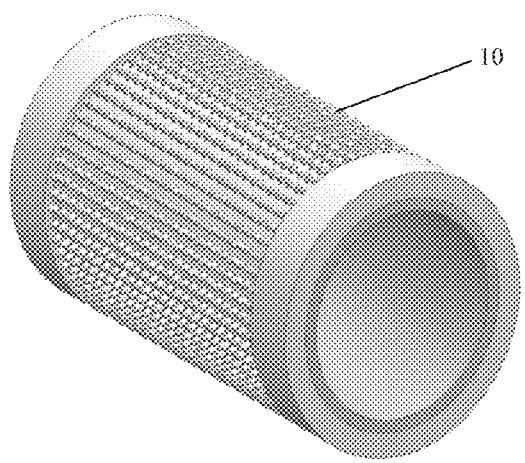
FIG. 7 shows an applicator element of the tool of FIG. 1.
Figure 8:
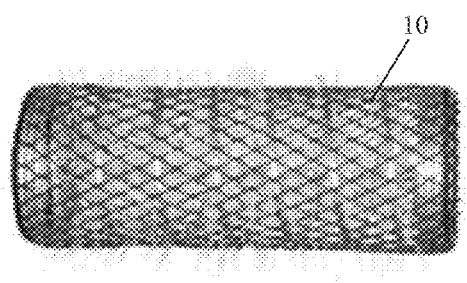
FIG. 8 shows an applicator element of the tool of FIG. 1.
Figure 9:
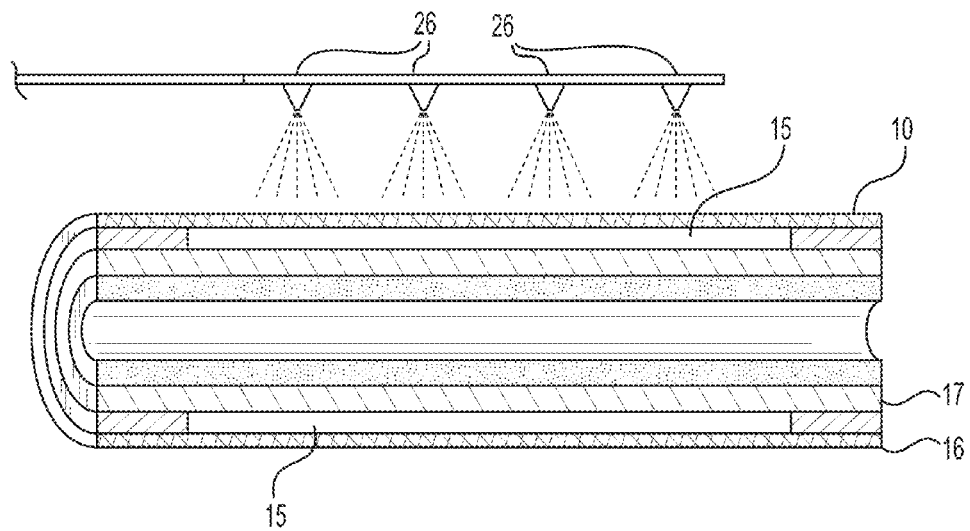
FIG. 9 shows a cross-sectional view through an applicator element of the tool of FIG. 1.
Figure 10:
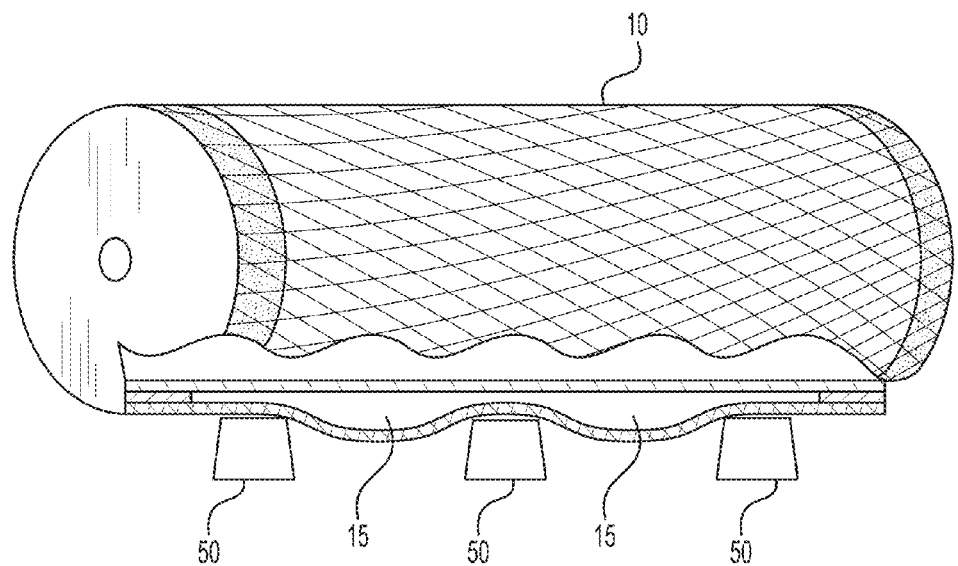
FIG. 10 shows an applicator element of the tool of FIG. 1.

The applicator 10 illustrated in FIG. 6 is grooved. FIGS. 7 and 8 show other possible applicator 10 designs. FIG. 7 shows an applicator 10 having knobs or spikes similar to the applicator 10 of FIG. 5, and FIG. 8 shows an applicator 10 having a meshed surface. Such geometries, for any applicator 10 form, are designed to create surface tension between the oil and outer surface to loosely hold the oil in location. As the outer surface of the applicator 10 rolls over the grill surface and engages with the grill grates or skillet, the soft cylinder surface of the applicator 10 deflects. The cylinder and surface geometry (spikes or grooves), now being deformed, will break the surface tension between grilling oil and soft silicone cylinder. Oil is then distributed in uniform and metered amounts to the cooking surface. The parts of the applicator 10 that are not deflected will continue to hold oil, so as not to drip down onto the fire. A dimpled applicator 10 surface would also create this surface tension and is another preferred form. Ends of the applicator 10 may be provided with a rise to prevent oil from flowing over the edge. A preferred width for the rise is approximately 0.5 in FIG. 9 shows a cross-sectional view through a preferred applicator 10. This applicator 10 has a layered design, with a void 15 defined between the layers. The outer layer 16 is formed of a fire retardant material, and preferably has a meshed geometry, though other geometries as discussed above are also preferred. The inner layer 17 is formed of a material that is impermeable to oil, stainless steel being a preferred material. Oil is applied to the outer layer 16 via the dispensing nozzles 26. The oil flows through the outer layer 16 and into the void 15 defined between the inner 17 and outer 16 layers. The oil is retained within the void 15 due to surface tension. In use, the outer layer 16, being flexible, deforms when pressed against the grill cooking elements 50. This is illustrated in FIG. 10. The areas of the outer layer 16 in contact with the cooking elements 50 deform into the void 15, allowing oil to pass through the outer layer 16 to the cooking elements 50. Those areas of the outer layer 16 not in contact with the grill cooking elements 50 remain undisturbed. The oil is thus retained within the void 15 away from the cooking elements 50.

Preferred dimensions for the applicator 10 include approximately 4 in. in length with a is diameter of approximately 1.5 in. A through hole having a diameter of approximately 0.5 in. is provided through the longitudinal axis so that the applicator 10 may be positioned about the axle 12. Spikes, if present, preferably extend approximately 3 mm above the pad surface, have a thickness that tapers from approximately 2.35 mm at the base to approximately 1.1 mm at the tip, and are densely spaced at approximately 0.5 mm apart. These dimensions are large enough to allow the user to quickly apply oil to the grill white being small enough to ensure the tool 1 is not cumbersome. The body 20 preferably has a length of approximately 12 in. to approximately 18 in. to protect the user from the heat generated by the grill. Of course, other dimensions can be used without departing from the scope of the invention.

The applicators 10 of FIGS. 6 and 7 are shown as having a larger through hole diameter. This is to accommodate their placement on a wider axel 12, or an intermediary part between the axel 12 and the applicator 10. This minimizes the amount of fire-retardant material need to form the applicator 10. Preferred dimensions for this type of applicator 10 include a thickness of approximately 0.1 in. and an outer diameter of approximately 1.75 in.

The applicators 10 may be removed from the tool 1 and cleaned, such as by being run through a dishwasher. The applicators 10 may also be replaced periodically.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the invention has been described above as pertaining to an outdoor grill, it could be used in an indoor kitchen. The invention could also be used with pots and pans or an indoor griddle. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A culinary tool for use with a cooking element, comprising:
    a body having a handle; and
    an applicator rotatably coupled to said body, said applicator formed of a fire retardant material and having a porous structure capable of retaining a volume of liquid therein such that a compressive force applied to said applicator compresses said porous structure to dispense liquid retained therein to the cooking element.

2. The tool of claim 1, wherein said applicator has a cylindrical shape.

3. The tool of claim 1, wherein said fire retardant material is able to withstand temperatures up to approximately 350° for a duration of approximately 15-20 seconds.

4. The tool of claim 1, wherein said applicator further comprises a sleeve surrounding said porous structure such that during use the liquid is dispensed from said porous structure through said sleeve to the cooking element.

5. A culinary tool for use with a cooking element, comprising:
    a body; and
    an applicator rotatably coupled to said body, said applicator formed of a fire retardant material and configured to retain and transfer a volume of cooking oil to the cooking element upon application of a force of sufficient magnitude to said applicator.

6. The tool of claim 5, wherein said applicator has a porous structure capable of retaining a volume of cooking oil therein such that a compressive force applied to said applicator compresses said porous structure to dispense cooking oil retained therein.

7. The tool of claim 5, further comprising an irrigation system for transferring cooking oil to said applicator, said irrigation system including:
    a reservoir for retaining a supply of the cooking oil;
    tubing in fluid communication with said reservoir; and
    a dispenser in fluid communication with said tubing, said dispenser positioned so as to dispense the cooking oil onto said applicator.

8. The tool of claim 7, wherein said applicator is textured for creating surface tension in the cooking oil to retain the cooking oil in said applicator.

9. The tool of claim 1, wherein said fire retardant material is able to withstand temperatures up to approximately 600° for a duration of approximately 15-20 seconds.

10. The tool of claim 1, wherein said applicator is formed of silicone.

* * * * *